United States Patent
Bäbler

(10) Patent No.: US 6,323,342 B1
(45) Date of Patent: Nov. 27, 2001

(54) GAMMA QUINACRIDONE PIGMENT

(75) Inventor: Fridolin Bäbler, Hockessin, DE (US)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 09/625,800

(22) Filed: Jul. 26, 2000

Related U.S. Application Data

(60) Provisional application No. 60/147,454, filed on Aug. 5, 1999.

(51) Int. Cl.⁷ .................. C07D 471/02; C09B 48/00; C09B 67/10
(52) U.S. Cl. ............. 546/49; 106/497; 106/499; 546/56; 546/57
(58) Field of Search ............... 546/49, 56, 57; 106/497, 499

(56) References Cited

U.S. PATENT DOCUMENTS

| | | | |
|---|---|---|---|
| 2,844,484 | 7/1958 | Reidinger et al. | 106/288 |
| 2,844,485 | 7/1958 | Struve | 106/288 |
| 2,844,581 | 7/1958 | Manger et al. | 260/279 |
| 2,857,400 | 10/1958 | Cooper | 260/246 |
| 3,074,950 | 1/1963 | Deuschel et al. | 260/279 |
| 3,386,843 | 6/1968 | Jaffe et al. | 106/288 |
| 4,310,359 | 1/1982 | Ehashi et al. | 106/288 |
| 4,692,189 | 9/1987 | Babler et al. | 106/308 |
| 4,760,144 | 7/1988 | Jaffe | 546/49 |
| 4,857,646 | 8/1989 | Jaffe | 546/49 |
| 5,194,088 | 3/1993 | Babler et al. | 106/412 |
| 5,229,515 | 7/1993 | Pfenninger et al. | 546/49 |
| 5,281,269 | 1/1994 | Ganci et al. | 106/497 |
| 5,840,901 | 11/1998 | Babler | 546/49 |

*Primary Examiner*—C. S. Aulakh
(74) *Attorney, Agent, or Firm*—David R. Crichton

(57) ABSTRACT

A new gamma-I type quinacridone pigment characterized by C.I.E color space values in masstone, and a process for its preparation is disclosed. The new gamma quinacridone pigment is especially useful for coloring coating compositions, such as automotive paints, and plastics.

17 Claims, 1 Drawing Sheet

GAMMA QUINACRIDONE PIGMENT

Figure 1:
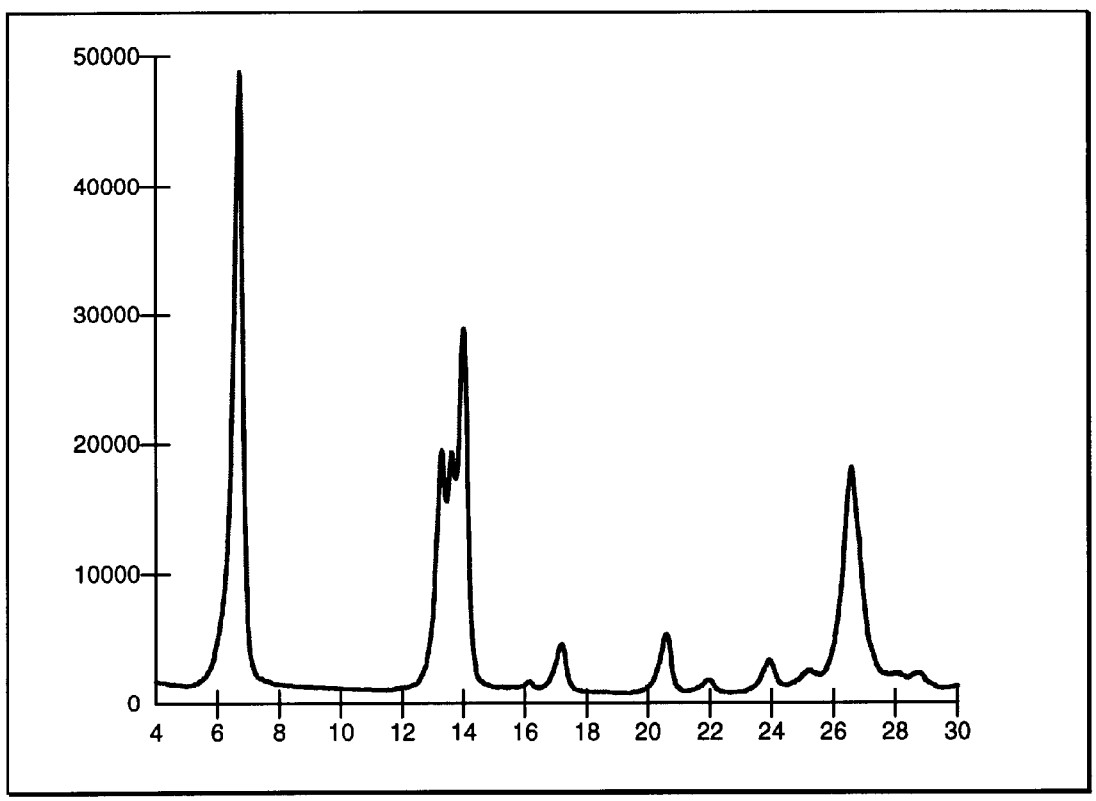

This application claims benefit to Provisional Application No. 60/147,454 filed Aug. 5, 1999.

SUMMARY

The present invention relates to a quinacridone pigment, in particular to a novel form of a gamma-I type quinacridone pigment having a distinguished color characteristic, its preparation and its use as a pigment in high molecular weight organic materials.

BACKGROUND

Quinacridone, also referred to as 5,12-dihydroquino[2,3-b]acridine-7,14-dione, is a well-known pigment having the formula I

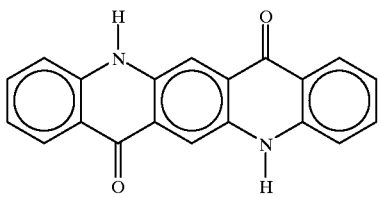

(I)

Quinacridone is known to exist in three major polymorphic modifications: the alpha, beta and gamma form.

The red alpha form is disclosed in U.S. Pat. No. 2,844,484; The beta form is disclosed as a magenta pigment in the U.S. Pat. Nos. 4,857,646; 5,229,515 and 5,281,269; and as a strong violet pigment in U.S. Pat. No. 2,844,485.

Several patents describe various forms of the red gamma quinacridone pigments. For example U.S. Pat. No. 2,844,581 describes a bluish red gamma-II, U.S. Pat. No. 3,074,950 describes a yellowish red gamma-I and U.S. Pat. No. 5,223,624 describes another yellowish red, a gamma-III-form, its X-ray-diffraction pattern and essential color characteristics.

U.S. Pat. No. 4,760,144 describes a process for the preparation of a yellowish red gamma-I type quinacridone form by conversion of the red gamma-II type quinacridone, in that the red gamma-II is milled in alcohol/base or premilled followed by an aftertreatment in a solvent.

The present invention relates to a novel gamma-I type quinacridone pigment having a distinguished color characteristic and its preparation by a new finishing or direct pigmentary procedure. In particular, the inventive pigment is characterized by its color space, its x-ray-diffraction pattern, which is a gamma-I type form; its specific surface area, which is typically in the range of 17±6 m$^2$/g, and its primary pigment particle size, which is generally in the range of 0.1 to 0.5 µm.

In comparison to the known gamma quinacridone pigments the new gamma form shows a considerably higher chroma and a distinct difference in hue. The higher the chroma of an organic pigment the more valuable the pigment is. A higher chroma pigment is more attractive and offers better and more styling opportunities in combination with other pigments, for example with other organic, inorganic pigments or pearlescent mica pigments. Thus, a difference in chroma can be of considerable commercial importance. Due to the outstanding fastness properties, its excellent rheological properties and unique color characteristics, it is highly suited for use in plastics and coatings applications, particularly in automotive coating systems.

DETAILED DESCRIPTION

The present invention relates to a novel gamma-I type quinacridone pigment which is specified by its color space values. The color space values are obtained by known measurements (as noted hereafter) from for example sprayed paint panels of a pigment masstone. The color space values are defined using the 1976 CIE standard calculation as base and are expressed in L, A, B numbers.

The color space values of the new gamma-I type quinacridone according to the present invention are characterized by the following numbers:

| | COLOR SPACE | | |
|---|---|---|---|
| color space coordinates | Broad Range | Preferred Range | Most Preferred Range |
| C (Chroma) | 48–59 | 49–58 | 50–57 |
| L (Lightness) | 40–47 | 40–46 | 41–45 |
| A (red/green) | 43–53 | 43–52 | 44–52 |
| B (yellow/blue) | 21–28 | 21–27 | 21–26 |

The color measurements were carried out in a large area view with a spectral component included using a ACS Colorimeter Program on an ACS, CS-5 Chromasensor from Applied Color Systems, Inc. and distributed by DATA COLOR International.

In order to measure the color data, the inventive pigment is first incorporated into a substrate, for example a basecoat/clearcoat paint system such as those described in Example 5. It is the color data of the pigmented substrate such as the coated panel or a pigmented plastic sheet which is then measured. The color data are measured at "complete hide", which means that the substrate is pigmented to such an extent that any background color is not observable. At "complete hide" it is not possible to see the background color of a coated panel or the background color through a pigmented plastic sheet.

Appropriate substrates include lacquers, inks, coating compositions, and plastics. Especially appropriate coating compositions include the basecoat/clearcoat systems conventionally used in the automotive industry. Especially appropriate plastics include the polyvinyl halides, especially polyvinyl chloride, and the polyolefins, for example low or linear low density or high density polyethylene and polypropylene.

A pigment masstone means that the inventive pigment is the only pigment used to color the substrate.

In comparison to the known commercially available gamma quinacridones, such as MONASTRAL Red Y RT-759-D, from Ciba Specialty Chemicals, Tarrytown, N.Y. or HOSTAPERM Red E3B from Clariant, the new gamma quinacridone surprisingly has a yellower hue and a considerably higher chroma.

In general, at least 50 percent of the particles in the inventive pigment have a primary pigment particle size in the range of from 0.1 to 0.5 µm, preferably 0.1 to 0.3 µm as shown by an electron micrograph.

The inventive pigment shows a specific surface area of 17±6 m$^2$/g, preferably 17±4 m$^2$/g as determined by the BET method.

The inventive quinacridone pigment shows an X-ray diffraction pattern which shows the main peaks of a gamma quinacridone as depicted in FIG. 1. The x-axis of FIG. 1 reflects the double glancing angles while the y-axis reflects the intensity of the diffracted ray. Thus, the new gamma quinacridone is characterized by an x-ray diffraction pattern that exhibits three strong peaks corresponding to ±0.2 two θ double glancing angles of 6.6, 13.9 and 26.5, two medium strength peaks corresponding to 13.2 and 13.5, and eight relatively weak peaks corresponding to 16.0, 17.0, 20.4, 21.8, 23.8, 25.1, 27.7 and 28.6. The X-ray diffraction pattern of the new high chroma gamma quinacridone is that of a gamma-I type. However, it can differ slightly with respect to the intensity and position of the 26.5 peak and the three peaks between 13 and 14.5 two θ double glancing angles.

The new gamma quinacridone has superior pigment properties, such as high opacity, excellent rheological properties, heat stability and weatherability behavior, as well as a remarkably good flocculation resistance. It is easily dispersible and develops quickly a high color strength.

Although the inventive pigment shows excellent application properties, in order to further improve the pigment properties of the inventive gamma quinacridone pigment, texture-improving agents and/or anti-flocculants are optionally added before, during or after the corresponding preparatory process.

The texture-improving agent and/or anti-flocculant is preferably incorporated into the inventive gamma quinacridone pigment in an amount of from 0.05 to 20 percent, most preferably 1 to 10 percent, by weight, based on the combined weights of the gamma quinacridone pigment, texture-improving agent and/or anti-flocculant mixture.

Texture-improving agents are especially useful as an additional component which improves the properties of the inventive gamma quinacridone pigment. Suitable texture-improving agents include fatty acids having at least 12 carbon atoms, and amides, esters or salts of fatty acids. Typical fatty acid derived texture-improving agents include fatty acids such as stearic acid or behenic acid, and fatty amines such as laurylamine and stearylamine. In addition, fatty alcohols or ethoxylated fatty alcohols, polyols such as aliphatic 1,2-diols, glycerol mono stearate or polyvinylalcohol and epoxidized soy bean oil, waxes, resin acids and resin acid salts are suitable texture-improving agents.

Anti-flocculants are known in the pigments industry and are often also used as rheology improving agents, for example, pigment derivatives such as sulfonic acid, sulfonic acid salts like metal or quaternary alkylammonium salts or sulfonamide derivatives. Generally, antiflocculants which are derivatives of a pigment from pigment classes such as those described in U.S. Pat. Nos. 3,386,843; 4,310,359 and/or 4,692,189 are preferably utilized, which are incorporated herein by reference.

Due to its outstanding chemical resistance, heat stability, weather and light stability, the inventive gamma quinacridone pigment is highly suitable for the coloration of various substrates such as inorganic materials and in particular high molecular weight organic materials. Thus, the present invention relates to a method of coloring a high molecular weight organic material which comprises incorporating an effective pigmenting amount of the inventive pigment into the high molecular weight organic material and to a composition comprising a high molecular weight organic material and an effective pigmenting amount of the inventive gamma quinacridone pigment.

An effective pigmenting amount is any amount suitable to provide the desired color in the high molecular weight organic material. In particular, the inventive gamma quinacridone pigment is used in an amount of 0.01 to 30% by weight, preferably 0.1 to 10% by weight, based on the weight of the high molecular weight organic material to be pigmented.

The pigmented, high molecular weight organic materials which are colored with the inventive pigment are useful in a variety of applications. For example, the inventive pigment is useful for the pigmentation of lacquers, inks, enamel coating compositions and thermoplastic or thermoset polymers.

The high molecular weight organic materials which are colored with the inventive pigment are, for example, cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

High molecular weight organic materials which are useful for heat-curable coatings or cross-linked, chemically-reactive coatings, are also colored with the inventive pigment. The pigmented, high molecular weight organic materials prepared according to the present invention are especially useful in finishes which contain customary binders and which are reactive at high temperature. These finishes can be obtained from solvent or aqueous or powder paint systems known in the art. Examples of pigmented, high molecular weight organic materials which are used in coatings include acrylic, alkyd, epoxy, phenolic, melamine, urea, polyester, polyurethane, blocked isocyanate, benzoguanamine or cellulose ester resins, or combinations thereof. The pigmented, high molecular weight organic materials prepared according to the present invention are also useful as air-drying or physically-drying coatings for example in cosmetics use.

The inventive gamma quinacridone pigment is particularly suitable for preparing coatings conventionally employed in the automobile industry, especially in acrylic/melamine resin, alkyd/melamine resin or thermoplastic acrylic resin systems, as well as in aqueous based coating systems.

Coatings and ink systems colored with the inventive gamma quinacridone pigment possess a high gloss, excellent heat, light and weather fastness, as well as bleed and overspraying fastness properties.

The inventive pigment can be prepared by any method capable of producing the gamma-I type form of a quinacridone pigment, provided that the above-described pigment properties and color characteristics are obtained. Suitable methods are, for example, finishing processes which start from an unsubstituted quinacridone crude or direct pigmentary procedures by which, for example, the 6,13-dihydroquinacridone is oxidized to the gamma quinacridone.

In a preferred finishing method a beta quinacridone crude is premilled and after treated in a polar solvent such as dimethyl acetamide, tetramethyl urea, methyl formamide, tetramethyl sulfone and preferably dimethyl sulfoxide (DMSO), dimethyl formamide (DMF) or N-methylpyrrolidone (NMP) and optionally, in the presence of a suitable particle growth and phase director.

The premilling of the beta quinacridone crude of the above finishing procedure is carried out in a horizontal or a vertical bead mill such as an attritor or ball mill or in a high speed mixer known in the industry. The after treatment step in the polar solvent is carried out in any suitable equipment such as a kneader or preferably a vessel with a stirrer.

Although the general procedure of such a finishing method is described in patents like for example U.S. Pat.

Nos. 2,857,400 and 5,194,088, which are each incorporated herein by reference, the key to preparing the inventive gamma quinacridone is the use of a quinacridone crude, preferably a beta quinacridone crude of a high purity. High purity means a beta quinacridone crude that is substantially free of the starting materials, for example the 6,13-dihydroquinacridone or other by-products generated during the quinacridone synthesis.

The high purity beta quinacridone crude preferably has a purity of above 99.5%, most preferably of above 99.8% as measured by a spectroscopic method. Advantageously, a high purity beta quinacridone crude that is substantially free of 6,13-dihydroquinacridone, quinacridone quinone or other quinacridone by-products is prepared by the oxidation of the 6,13-dihydroquinacridone in the presence of an oxidation promoting catalyst, such as quinone compounds, with hydrogen peroxide as the oxidant as described in the U.S. Pat. No. 5,840,901, which is incorporated herein by reference.

It is new and, based on the state of the art, unexpected that a violet beta quinacridone can be converted into a high chroma yellowish red gamma quinacridone.

Beta quinacridone crude pigments are produced in large quantities in the industry for the preparation of the finished violet beta quinacridone pigment forms. The beta quinacridone crude production belongs to the most economic quinacridone synthesis route.

In a preferred direct pigmentary method the new gamma quinacridone crude is prepared by the oxidation of 6,13-dihydroquinacridone in the presence of a catalyst and advantageously in the presence of a specific crystal phase director with hydrogen peroxide as the oxidant.

Suitable pigment particle growth and particle phase directors which can be used for the preparation of the new gamma form by the above described finishing or direct pigmentary procedures are for example described in pending patent applications by the named inventor herein, having Ser. No. 60/118,419 and 60/118,405, both filed on Feb. 2, 1999, which are incorporated herein by reference.

Preferred pigment particle growth controllers and crystal phase directors are for example reaction products in which quinacridone of formula I or 6,13-dihydroquinacridone of formula 11

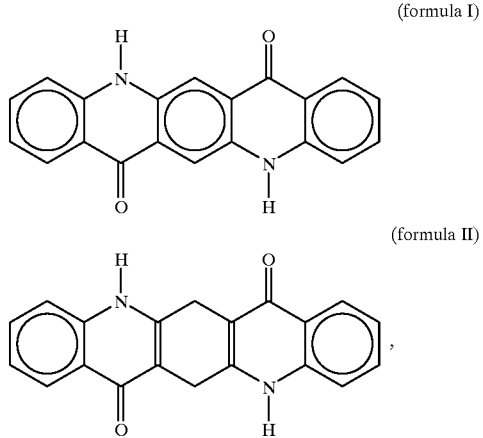

is reacted with an aromatic sulfonic acid such as toluene sulfonic acid or with a heterocyclic group such as barbituric acid, respectively, with formaldehyde in an approximately 1 to 1 to 1 molar ratio in concentrated sulfuric acid followed by drowning in water and isolation of the reaction product.

The following examples illustrate various embodiments of the invention, but the scope of the invention is not limited thereto. In the examples, all parts are by weight unless otherwise indicated. The x-ray diffraction patterns are measured on a RIGAKU GEIGERFLEX diffractometer, type D/MaxlI v BX. The coloristic data are obtained utilizing a CS-5 CHROMA SENSOR spectrophotometer as described above.

EXAMPLE 1A

A high purity beta quinacridone crude with a particle size of 2 to 6 μm and a quinacridone content of 100% as determined by a spectrophotometric method, and which is obtained by the oxidation of 6,13-dihydroquinacridone with hydrogen peroxide as the oxidant as described in U.S. Pat. No. 5,840,901 is premilled according to the following procedure:

A 1-SDG Attritor™ mill manufactured by Union Process, Inc. Akron, Ohio, which is fitted with L-arms and contains 3.78 liters of 0.6 cm diameter ceramic grinding media with 7.5 MOH hardness, 60–65 Rockwell 45 N hardness, 3.0 kg/cm impact strength and 8500 kg/cm compressive strength. The mill is charged with 350 grams of the beta quinacridone crude and the pigment is milled under a nitrogen flow at a rotation speed of 500 RPM for 50 minutes. At the conclusion of the milling cycle, the product is recovered by opening the valve at the bottom of the mill while rotation continues for 15 minutes yielding a brown highly aggregated powder with a low crystallinity.

EXAMPLE 1B

A one liter flask equipped with a thermometer, stirrer and condenser was charged with 0.3 grams of a barbituric acid methyl-6,13-dihydroquinacridone additive in accordance with the disclosure of pending application 60/118,419, and 250 ml DMF (dimethylformamide). The mixture is stirred at 50–55° C. for 15 minutes whereby the additive is partially dissolved in the solvent. 33 grams of the premilled powder prepared according to Example 1A is added. The suspension is diluted with 80 ml DMF and stirred for 2½hours at 50–55° C. The resulting red suspension is filtered. The press cake is washed with water and dried yielding a red pigment which shows excellent durability and a high chroma as noted in Example 5. The X-ray diffraction pattern shows the characteristic of the gamma-I type quinacridone (FIG. 1) with the following data:

| SCATTERING ANGLE (° 2θ) | RELATIVE INTENSITY (%) |
| --- | --- |
| 6.7 | 100 |
| 13.3 | 40 |
| 13.6 | 40 |
| 14.0 | 60 |
| 17.2 | 9 |
| 20.6 | 11 |
| 21.9 | 4 |
| 23.9 | 7 |
| 25.2 | 5 |
| 26.6 | 37 |
| 28.7 | 5 |

EXAMPLE 2

The procedure of Example 1B is repeated, using instead of DMF the same amount of dimethyl sulfoxide (DMSO) as the polar solvent, yielding a gamma quinacridone with a similar x-ray diffraction pattern, color characteristics and similar good pigment properties.

EXAMPLE 3

A one liter flask equipped with a thermometer, stirrer and condenser was charged with 250 ml NMP (N-methyl pyrrolidone). 25 grams of the premilled powder prepared according to Example 1A are added. The suspension is stirred for 3 hours at 48–52° C. The resulting red suspension is filtered. The press cake is washed with water and dried yielding a red pigment which shows excellent durability and a high chroma as noted in the following application examples. The X-ray diffraction pattern shows the main characteristic of a gamma-I type quinacridone with the following data:

| SCATTERING ANGLE (° 2θ) | RELATIVE INTENSITY (%) |
|---|---|
| 6.4 | 96 |
| 13.0 | 50 |
| 13.4 | 66 |
| 13.7 | 100 |
| 16.9 | 13 |
| 20.3 | 14 |
| 23.7 | 20 |
| 24.9 | 13 |
| 26.3 | 89 |
| 27.8 | 10 |
| 28.5 | 11 |

EXAMPLE 4

A one liter flask equipped with a thermometer, stirrer and condenser was charged with 40 grams 6,13-dihydroquinacridone, 250 ml methanol, 52.8 grams 50% aqueous sodium hydroxide and 3.0 grams 50% aqueous benzyl tributyl ammonium chloride. The mixture was stirred under a slow flow of nitrogen at 30 to 45° C. for five minutes, heated to 50 to 55° C. and stirred at 50 to 55° C. for one hour. 0.8 grams of the pigment additive toluene sulfonic acid methyl quinacridone in accordance with the teachings in pending application Ser. No. 60/118,405, was added, followed by the addition of 0.5 grams anthraquinone mono sulfonic acid sodium salt as catalyst, and the reaction mixture was heated to reflux. 73 grams of an aqueous 17% hydrogen peroxide solution were added into the reaction mixture with a peristaltic pump at a setting of 0.3 ml/minute maintaining reflux under a slow nitrogen flow. The resulting reddish suspension was further stirred for 10 minutes at reflux then diluted with 100 ml cold water and filtered. The presscake was washed with hot water then dried, yielding 38.9 grams red quinacridone.

The x-ray diffraction pattern of the pigment shows the characteristics of a gamma-I type quinacridone. When incorporated into plastics or paints the pigment imparts a high chroma bright yellowish red color with excellent pigment properties as noted in the following application examples.

EXAMPLE 5

This Example illustrates the incorporation of the inventive gamma quinacridone prepared according to Example 1B into an automotive paint system.
Millbase Formulation A pint jar is charged with 30.9 grams acrylic resin, 16.4 grams AB dispersant consisting of 45% of an acrylic resin in toluene, and 42.8 grams solvent (SOLVESSO 100 from American Chemical). 30.0 grams gamma quinacridone obtained according to Example 1B and 980 grams of 4 mm diameter steel diagonal rods are added. The mixture in the jar is shaken on a Skandex shaker for 5 hours. The millbase contains 25.0% pigment with a pigment/binder ratio of 0.5.
Masstone Color 48.9 grams of the above millbase, 71.7 grams of a clear 47.8% solids unpigmented resin solvent solution containing a melamine resin catalyst, a non-aqueous dispersion resin and a UV absorber, and 29.4 grams of a clear unpigmented 58% solids unpigmented polyester urethane resin solvent solution, are mixed and diluted with a solvent mixture comprising 76 parts xylene, 21 parts butanol and 3 parts methanol to a spray viscosity of 20–22 seconds as measured by a #2 Fisher Cup.

The resin/pigment dispersion is sprayed onto a panel twice at 1½minute intervals as basecoat. After 2 minutes, the clearcoat resin is sprayed twice at 1½minute intervals onto the basecoat. The sprayed panel is then flashed with air in a flash cabinet for 10 minutes and then "baked" in an oven at 265° F. (129° C.) for 30 minutes, yielding a red colored panel. The coated panel has excellent weatherability as shown by the exposure data in an ATLAS weather-O-meter.

The following color characteristic data are measured on the coated panel.

C.I.E. $L^*$, $a^*$, $b^*$, $C^*$ color space value numbers using a D65 illuminant and 10 degree observer with a specular component included:

Ti $L^*$=41.7; $a^*$=46.9; $b^*$=23.1; $C^*$=52.3

EXAMPLE 6

63.0 grams of polyvinyl chloride, 3.0 grams epoxidized soy bean oil, 2.0 grams of barium/cadmium heat stabilizer, 32.0 grams dioctyl phthalate and 1.0 gram of the gamma quinacridone pigment prepared according to Example 1B or 2 to 4 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2, by constant folding, removal and feeding. The resulting soft PVC sheet is colored in an attractive red shade and has excellent fastness to heat, light and migration.

EXAMPLE 7

Five grams of the gamma quinacridone pigment prepared according to Example 1B, 2.65 grams CHIMASORB 944LD (hindered amine light stabilizer), 1.0 gram TINUVIN 328 (benzotriazole UV absorber) and 2.0 grams IRGANOX B-215 Blend (anti-oxidant), all available from Ciba Specialty Chemicals Corporation, are mixed together with 1000 grams of high density polyethylene at a speed of 175–200 rpm for 30 seconds after flux. The fluxed, pigmented resin is chopped up while warm and malleable, and then fed through a granulator. The resulting granules are molded on an injection molder with a 5 minute dwell time and a 30 second cycle time at a temperature of 204° C. (400° F.). Homogeneously colored chips which show a saturated red color and have excellent light stability are obtained.

The following color characteristic data are measured on the colored chip.

C.I.E. $L^*$, $a^*$, $b^*$, $C^*$ color space value numbers using a D65 illuminant and 10 degree observer with a specular component included:

$L^*$=43.4; $a^*$=50.7; $b^*$=25.3; $C^*$=56.7

EXAMPLE 8

1000 grams of polypropylene granules (DAPLEN PT-55® from Chemie Linz) and 10 grams of the gamma quinacridone pigment obtained in Example 1B or 2–4 are thoroughly mixed in a mixing drum. The granules so obtained are melt spun at 260–285° C. to red filaments of good light fastness and textile fiber properties.

I claim:

1. A gamma-I type quinacridone pigment having C.I.E color space values in masstone of C=48–59; L=40–47; A=43–53; B=21–28, measured from a panel coated to complete hide with a basecoat/clearcoat paint system, wherein the gamma quinacridone is prepared from a high purity beta quinacridone crude that is substantially free of other quinacridone by-products.

2. A gamma-I type quinacridone pigment according to claim 1, which has C.I.E color space values in masstone of C=49–58; L=40–46; A=43–52; B=21–27, measured from a panel coated to complete hide with a basecoat/clearcoat paint system.

3. A gamma-I type quinacridone pigment according to claim 1, which has C.I.E color space values in masstone of C=50–57; L=41–45; A=44–52; B=21–26, measured from a panel coated to complete hide with a basecoat/clearcoat paint system.

4. A gamma-I type quinacridone pigment according to claim 1, wherein at least 50 percent of the primary pigment particles have a particle size in the range from 0.1 to 0.5 micrometers as determined by electron micrograph.

5. A gamma-I type quinacridone pigment according to claim 1 having an x-ray diffraction pattern which exhibits three strong peaks corresponding to ±0.2 two θ double glancing angles of 6.6, 13.9 and 26.5, two medium strength peaks corresponding to 13.2 and 13.5, and eight relatively weak peaks corresponding to 16.0, 17.0, 20.4, 21.8, 23.8, 25.1, 27.7 and 28.6.

6. A gamma-I type quinacridone pigment according to claim 1, having a specific surface area of about 17±6 $m^2/g$ as determined by BET method.

7. A process for the preparation of a gamma-I type quinacridone according to claim 1, wherein a quinacridone crude is premilled followed by an aftertreatment in a polar solvent.

8. A process for the preparation of a gamma-I type quinacridone according to claim 7, wherein said quinacridone crude is a beta quinacridone crude.

9. A process for the preparation of a gamma-I type quinacridone according to claim 7, wherein the aftertreatment is carried out in the presence of a quinacridone- or 6,13-dihydroquinacridone derivative as a crystal size and crystal phase director.

10. A process for the preparation of a gamma-I type quinacridone according to claim 7, wherein the polar solvent is dimethyl acetamide, tetramethyl urea, methyl formamide, tetramethyl sulfone and preferably dimethyl sulfoxide (DMSO), dimethyl formamide (DMF) or N-methylpyrrolidone (NMP).

11. A process for the preparation of a gamma-I type quinacridone according to claim 10, wherein the polar solvent is DMF, DMSO or NMP.

12. A process for the preparation of a gamma-I type quinacridone according to claim 1, wherein the gamma quinacridone is prepared by a direct pigmentary process starting from 6,13-dihydroquinacridone in the presence of a catalyst and using hydrogen peroxide as the oxidant.

13. A process for the preparation of a gamma-I type quinacridone according to claim 12, wherein a quinacridone- or 6,13-dihydroquinacridone derivative as a crystal size and crystal phase director is present during the oxidation reaction.

14. A composition comprising a high molecular weight organic material selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof and an effective pigmenting amount of a gamma-I type quinacridone pigment according to claim 1.

15. A composition according to claim 14, wherein said high molecular weight organic material is a plastic that is subsequently calendered, cast, molded or processed to fibers.

16. A composition according to claim 14, wherein said high molecular weight organic material is an industrial or automotive paint or ink coating.

17. A process for coloring a high molecular weight organic material, which comprises incorporating an effective pigmenting amount of the pigment according to claim 1 into the high molecular weight organic material.

* * * * *